June 11, 1940.　　　　K. F. NYSTROM　　　　2,204,281
GENERATOR SUSPENSION MECHANISM
Filed Dec. 12, 1938　　　2 Sheets-Sheet 2
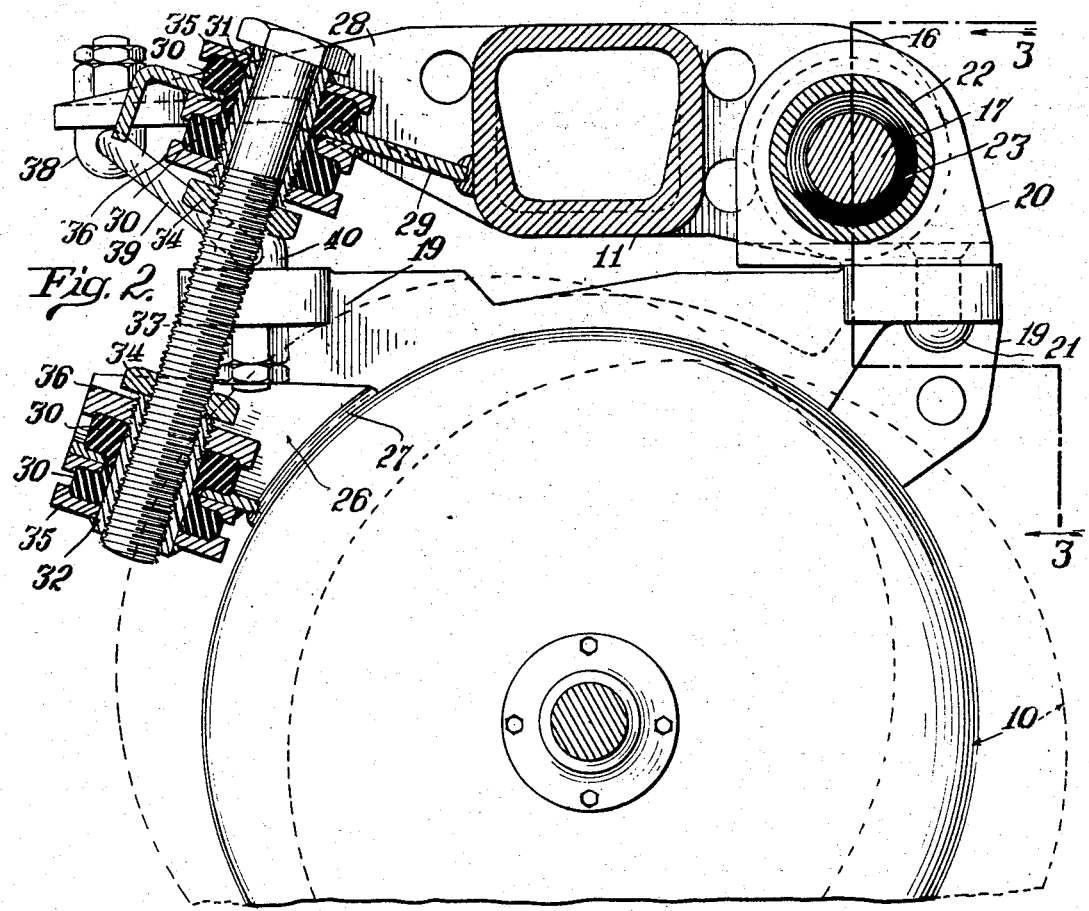
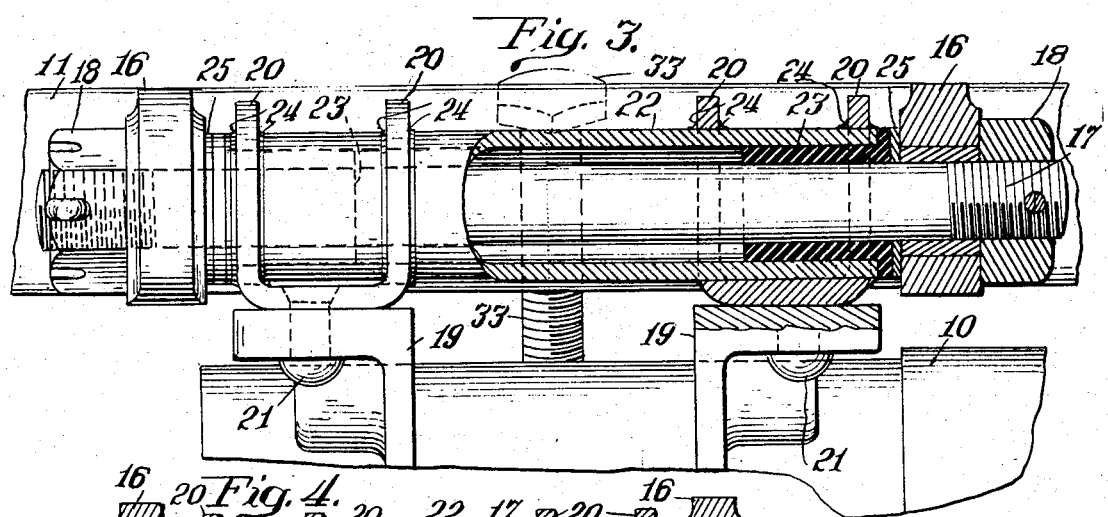
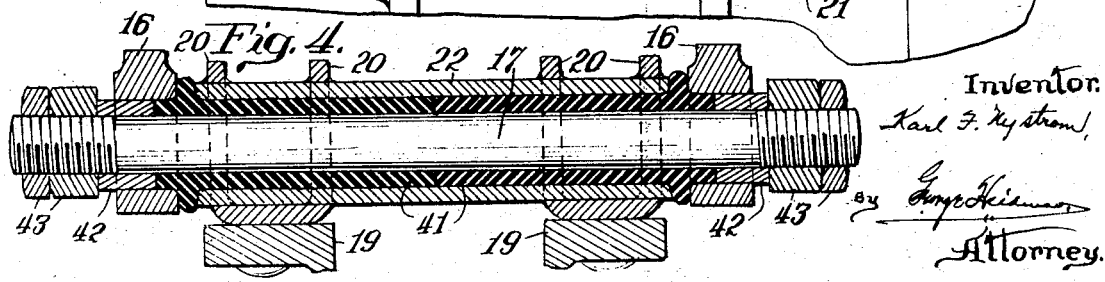

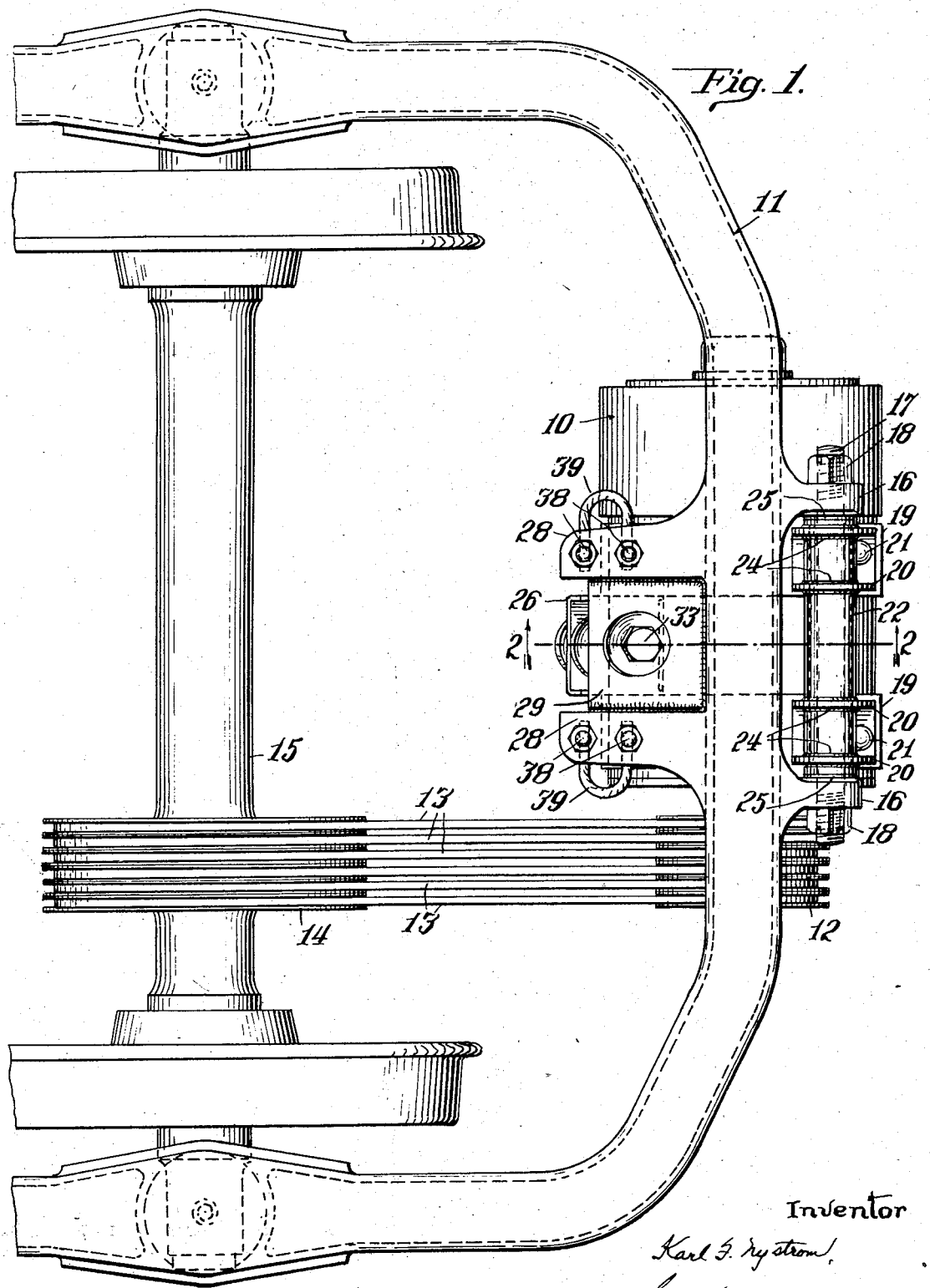

Patented June 11, 1940

2,204,281

UNITED STATES PATENT OFFICE 2,204,281

GENERATOR SUSPENSION MECHANISM

Karl F. Nystrom, Milwaukee, Wis.

Application December 12, 1938, Serial No. 245,247

7 Claims. (Cl. 105—106)

My invention relates to mechanism for yieldingly suspending the generators on the truck frames of passenger railroad cars and involves means for properly cushioning the generator to absorb vibrations and to prevent excessive movement or jerks on the generator belts which are driven from suitable pulleys operatively connected with one of the wheel axles of the trucks; the invention also having for its object the provision of a construction which permits endless belts to be employed for driving the armature shaft of the generator and thereby obviating difficulties encountered with constructions as heretofore employed involving split belts.

The invention also has for its object the provision of a construction whereby the pivotal mounting of the generator coincides with or is so related to the center of gravity thereof that the latter tends to maintain the driving belts taut; the mechanism also involving means whereby the degree of swinging movement of the generator is cushioningly controlled and the normal position of the generator, relative to its pivotal suspension, regulated.

The objects of the invention and its advantages will be more fully comprehended from the detailed description of the accompanying drawings, wherein:

Figure 1 is a top plan view of one end of a truck with the generator pivotally suspended from the end member or sill of the truck frame by means of my improved mechanism.

Figure 2 is a cross sectional view taken on the line 2—2 of Figure 1 looking in the direction of the arrows.

Figure 3 is a detail sectional view taken on the line 3—3 of Figure 2 looking in the direction of the arrows.

Figure 4 is a detail longitudinal sectional view, somewhat similar to Figure 3, illustrating a modification.

My invention relates to mechanism whereby the usual generator indicated at 10 is swingingly suspended from one end member or sill 11 of the truck frame; the armature shaft being provided with a suitable pulley indicated at 12 for receiving a plurality of endless belts 13 which are also disposed about a suitable pulley 14 arranged on the axle 15 of the truck.

The end member or sill 11 of the truck frame on its outer side is provided with a pair of lugs 16, 16 disposed laterally therefrom and integrally united with the truck frame; the lugs being apertured to receive a supporting shaft 17; the outer ends of the shaft 17 being preferably threaded to receive nuts 18.

The upper part of the generator 10, adjacent each end, is provided with brackets 19, 19 having laterally disposed portions to which the upstanding brackets 20, 20 are secured, as for example by the rivets 21. The brackets 20, 20 are apertured to receive a retaining tube 22; whose internal diameter is somewhat greater than the diameter of the supporting shaft 17 as shown in Figure 3 to receive the vibration resisting or rubber bushings 23, 23 inserted in each end of the tube 22; the bushings at their outer ends being preferably flanged as shown to lap the ends of the tube 22, see Figure 3. These bushings may be bronze or rubber as shown.

The tube 22 is preferably immovably secured in the upstanding brackets 20, 20, for example by welding as shown at 24, in order that the relation between the brackets 20 and the tube 22 may be constant. The shaft 17 extends through tube 22 and the flanged rubber bushings 23 and the shaft is provided with alignment washers 25.

In assembling the mechanism, the tube 22 is first inserted through the holes in the upstanding brackets 20, 20 and welded in place and the rubber or bronze bushings 23 inserted in the ends of the tube 22. The shaft 17 is then inserted endwisely through one of the lugs 16 and washer 25, thence through the rubber or bronze bushings 23 within tube 22 and washer 25 and the lug 16 at the other end. The threaded ends of the shaft are then provided with the nuts 18 which are screwed up tightly against the truck frame lugs 16 to prevent rotation of the shaft.

As shown in Figure 2, the brackets 19, secured to the generator 10, are disposed toward one side of the vertical median line of the generator so that the generator will be normally located beneath the end member or sill 11 of the truck frame, with the center of gravity of the generator disposed inwardly of the vertical plane of the point of suspension, with the result that the generator will tend to swing outwardly, relative to the end of the truck frame, and normally tend to place the belts 13 under tension.

The opposite side of the generator 10, which is disposed toward the wheel axle, and intermediate of the ends of the generator, is provided with a bracket 26, somewhat of U-shape cross section, with upstanding sides increasing in dimensions toward the generator and made slightly arcuate to conform with the curvature of the generator to which the bracket is integrally secured as by welding at 27; the bracket 26 being provided with an opening to receive the mechanism hereinafter to be described.

The end member or sill 11 of the truck frame on its inner side is provided with a pair of spaced apart arms 28 integrally secured thereto and disposed laterally therefrom. Arranged between the spaced arms 28 and integrally united therewith, as by means of welding, is a bracket plate 29 whose outer end is preferably flanged, as shown in Figure 2, to provide sufficient rigidity and this plate portion of the bracket is apertured for the purpose of receiving the stabilizer mechanism to be described.

Arranged on opposite sides of the apertured portions of brackets 26 and 29 are a pair of resilient cushion elements or rubber blocks 30 preferably provided with flange portions which extend into the apertures in the brackets. The upper pair of blocks 30 are in turn provided with holes to receive a sleeve member 31; while the lower pair of blocks 30 are apertured to receive a sleeve 32; the two sleeves, in turn, being intended to receive the adjusting bolt 33.

The sleeve 31 is adapted to slide on bolt 33 and is adjustably secured in place by means of jambnut 34 which screws onto the bolt 33 against the lower end of the sleeve 31. The upper end of sleeve 31 is provided with a washer 35 which is preferably integrally secured thereto and overlaps the top cushion block 30; while the lower external end of sleeve 31 is threaded to receive washer 36 which engages the lower rubber block 30 of the upper pair; the two washers maintaining the rubber blocks and sleeve in proper assembled relation, while the nut 34, which screws into engagement with the lower end of upper sleeve 31, draws the head of the bolt into engagement with the upper end of the sleeve and tends to prevent rotation of the bolt.

The sleeve 32 at the lower end of the stabilizer is internally threaded and screws onto the lower end of the bolt; the upper external end of the sleeve being also threaded to receive the screwwasher 36; while the lower unthreaded end of the sleeve 32 has a slip washer 35 welded thereto in a manner similar to washer 35 at the upper end of the bolt. The intimate relation between the rubber blocks 30, sleeve 32 and washers 35 and 36 is maintained by jamb-nut 34 which screws on bolt 33 and against the upper end of sleeve 32 after washer 36 has been properly screwed on the upper end of sleeve 32.

The outer ends of arms 28 of the truck frame are shown provided with eye-bolts 38 for securing the upper ends of safety cables 39, whose lower ends are secured by eye-bolts 40 mounted in the upper brackets 19 disposed across the top of the generator; a cable 39 being secured to each truck frame arm 28 and each bracket 19 on the generator 10; the cables 39 being of length greater than the distance between the arms 28 and the brackets 19 and hence are shown in loop form so as not to interfere with the adjustability of the stabilizer and the oscillatory or swinging movements of the generator; the cables 39 being intended to function as safety cables in the event of any breakage or failure on the part of the stabilizer mechanism.

In practice, the generators must be mounted to compensate for relative movements between the axles and truck frames and hence cannot be rigidly supported in place. On the other hand, too free swinging movement of the generator would be objectionable and would subject the driving belts to excessive strains and breakage.

By reason of the cushioned frictional relation between the supporting shaft 17 and the sleeve or tube 22, secured to the supporting brackets 20, a non-vibrating mounting is provided; while the rubber discs or blocks 30 with their associated elements will cushion the vibrations or damp the oscillatory movements of the generator and prevent excessive slaps and jerks on the belts.

The stabilizer mechanism is initially assembled with the washers 35 and 36 arranged on the respective sleeves so that the cushion blocks are firmly clamped in place on opposite sides of the brackets 29 and 26, and the jamb-nuts 34 screwed along the bolt 33 into firm relation with the opposing ends of the sleeves 31 and 32 so as to prevent tearing of the threads on the sleeve and also prevent independent rotation of the bolt 33; the distance between the sleeve and cushion elements at the upper end of the bolt and the sleeve and cushion elements at the lower end of the bolt being initially arranged to hold the center of the generator beneath the sill or end member of the truck frame, as shown in Figure 2, and with the driving belts 13 in taut condition. In order to take up slack in the driving belts during operation, jamb-nuts 34 are screwed out of intimate relation with the ends of the sleeves and bolt 33 is then turned so as to cause the sleeve 32 with its associated elements to move downwardly on the bolt and hence to exert downward pressure on bracket 26, secured to the generator, thereby causing the generator to move toward the vertical plane of the suspension shaft 17, namely to the right in Figure 2, to take up improper slack in the driving belts 13; the rubber blocks 30 absorbing the vibratory movements between the generator and truck and cushioningly preventing improper movements of the generator.

In Figure 4 I illustrate a modified construction of generator mounting, wherein the shaft 17 and sleeve or tube 22, in conjunction with lugs 16, 16 and brackets 19, 19 and 20, 20 are similar to those previously described.

Instead of employing a pair of short bronze or rubber bushings 23 a continuous rubber bushing 41, extending from end to end, is shown in Figure 4. While the bushing 41 may be in a single piece, for convenience in assembly, it is preferably in two equal sections as shown because the bushings are intended to snugly fit within the sleeve or tube 22, in frictional relation therewith; the bushing being also intended to have snug frictional relation with the supporting shaft 17.

The sleeve or tube 22, as in Figure 3, is of length somewhat shorter than the distance between the lugs 16, 16; and the rubber bushing is in the nature of cylindrical sections or tubing of combined length preferably slightly greater than the length of sleeve 22 and greater than the distance between the lugs 16, 16 so as to extend slightly into the holes in lugs 16, 16. The apertures in the lugs 16, 16, at the outer sides, are provided with gland members 42, which engage the ends of the bushing 41 and extend beyond the outer sides of the lugs 16, 16 to be engaged by the nuts 43, when the latter are screwed onto the ends of shaft 17. After the elements have been assembled, the nuts 43 are screwed up sufficiently to force the gland members 42 inwardly and to place the rubber bushing 41 under compression, causing the latter to bulge outwardly between the ends of the sleeve or tube 22 and the inner faces of the lugs 16, 16, as shown in Figure 4, thereby preventing metal to metal contact between the sleeve and the lugs, while at the same time providing a non-vibratory relation between the sleeve and the shaft; the orifices at the ends of the sleeve being preferably beveled to prevent injury to the bushing.

With this construction it is apparent that any relative movement between the shaft and the tube or sleeve must be by distortion of the bushing in shear, which tends to dampen or retard the swinging tendency of the generator.

The exemplifications herein described are believed to be the best embodiments of the invention and these embodiments have been described in terms employed merely as terms of description and not as terms of limitation, as structural modifications are possible and may be made without, however, departing from the spirit of my invention as defined in the appended claims.

What I claim is:

1. Generator suspension mechanism of the character described comprising, in combination with a railroad car truck frame and a belt driven generator; laterally disposed lugs arranged on one side of the truck frame end member; upstanding brackets secured adjacent the top of the generator; a tubular member rigidly secured between said upstanding brackets; rubber bushings inserted in the ends of said tubular member; a supporting shaft disposed through the lugs of the truck frame and through said bushings and tubular member whereby the generator is swingingly supported in place; and means operatively associated with the opposite side of the truck frame end member and the generator for adjustably holding the latter toward one side of the vertical plane of the supporting shaft, said means involving cushion elements for absorbing vibratory movements between the truck and the generator.

2. Generator suspension mechanism of the character described comprising in combination with a railroad car truck frame and a generator; spaced apart apertured lugs secured to one side of the truck frame end member; a tubular member rigidly secured adjacent the top of the generator to one side of the vertical median line of the generator, said tubular member being adapted to fit between the spaced lugs on the truck frame; vibration absorbing bushings arranged in the tubular member; a supporting shaft disposed through said lugs, tubular member and bushings; laterally disposed apertured brackets secured to the opposite sides of said truck frame end member and said generator; rubber cushion holding sleeves arranged in the apertures of said brackets; and a regulating bolt disposed through said sleeves in operative relation therewith whereby the relation between the center of gravity of the generator and the vertical plane of said supporting shaft may be controlled.

3. Generator suspension mechanism of the character described comprising, in combination with a railroad car truck frame and a generator; apertured spaced apart lugs disposed laterally from one side of the truck frame end member; a tubular member rigidly secured adjacent the top on one side of the generator and extending between said spaced apart lugs and provided with vibration absorbing means; a supporting shaft endwisely insertible through the spaced apart lugs and tubular member with its vibration absorbing means for swingingly supporting the generator below the truck frame end member; brackets disposed laterally from the opposite sides of the truck frame end member and of the generator in vertical spaced relation; cushioning elements secured to said brackets; an adjusting member disposed through the brackets on the truck frame end member and the generator and through said elements; and means for establishing operative relation between said elements and said adjusting member and to hold the latter in its adjusted positions.

4. Generator suspension mechanism of the character described comprising, in combination with a railroad car truck frame and a generator; means whereby the generator is swingingly supported from one side of the truck frame end sill so as to cause the generator to swing outwardly of the truck frame, said means involving vibration absorbing elements; brackets secured to the opposite side of the truck frame end sill and to the adjacent side of the generator, one above the other; sleeve members cushioned in said brackets; a control bolt disposed through said sleeve members; and means for effecting operative relation between said bolt and said sleeve members whereby the bolt is held against rotation and the spaced relation between the bracket on the frame end sill and the bracket on the generator controlled.

5. Generator suspension mechanism of the character described comprising, in combination with a railroad car truck frame and a generator; means secured to one side of the generator and to the outer side of the end sill of the truck frame and involving apertured lugs and a supporting shaft provided with a sleeve and vibration absorbing bushings intermediate of the shaft and the sleeve whereby the generator is swingingly supported beneath the truck frame end sill to normally swing toward the vertical plane of said means; laterally disposed and vertically spaced apertured brackets secured, respectively, to the inner side of the truck frame end sill and to the adjacent side of the generator; absorbing elements arranged in the apertures of said brackets; sleeve members disposed through said elements; a control member disposed through the sleeve members; and means operatively associated with the control member whereby the normal spacing between the brackets is controlled and relative movement between the truck frame end sill and the generator transmitted to said absorbing elements.

6. Generator suspension mechanism of the character described comprising, in combination with a car truck frame end sill and a generator; transversely apertured lugs disposed laterally from the end sill in spaced relation; upwardly disposed spaced apart brackets provided with a tube extending therethrough, said brackets and tube being secured to the generator and adapted to align with the apertures in said lugs; vibration absorbing means arranged in said tube; a supporting shaft disposed through said lugs, said tube and said vibration absorbing means; means operatively intermediate of the ends of the shaft and said lugs whereby said shaft is held against rotation and said vibration absorbing means placed under compression; regulable means intermediate of said end sill and the generator whereby the position of the latter relative to the vertical plane of said supporting shaft may be controlled, said means involving apertured brackets secured to the frame end sill and to the generator in vertical spaced relation, cushion elements arranged in the apertures of the brackets, sleeve members disposed through the cushion elements, a bolt disposed through the sleeve members, and means whereby a regulable operative relation between the sleeve members and said bolt is provided and the normal position of the generator relative to the axis of said supporting shaft is controlled.

7. Generator suspension mechanism of the character described comprising, in combination with a railroad car truck frame and a generator, means whereby the generator is swingingly mounted, at one side of its vertical median line, to the outer side of the truck frame end sill so as to normally swing toward the outer side of said sill, said means involving apertured lugs on the truck frame and apertured brackets on the generator, a generator supporting shaft disposed through the apertures of the lugs and of the brackets and vibration absorbing means intermediate of said shaft, said lugs and said brackets; and means operatively associated with the side of the generator disposed toward the truck axle and the inner side of the truck frame end sill whereby the generator is yieldingly held beneath the truck frame end sill and its position relative to the vertical plane of its supporting shaft controlled, said means involving sleeve elements having cushioned relation, respectively, with the truck end sill and with the generator; and a bolt disposed through said sleeve elements and operatively connected therewith whereby the generator is adjustably and yieldingly held toward one side of the vertical plane of its supporting shaft and vibrations between the truck and the generator absorbed.

KARL F. NYSTROM.